No. 782,760.

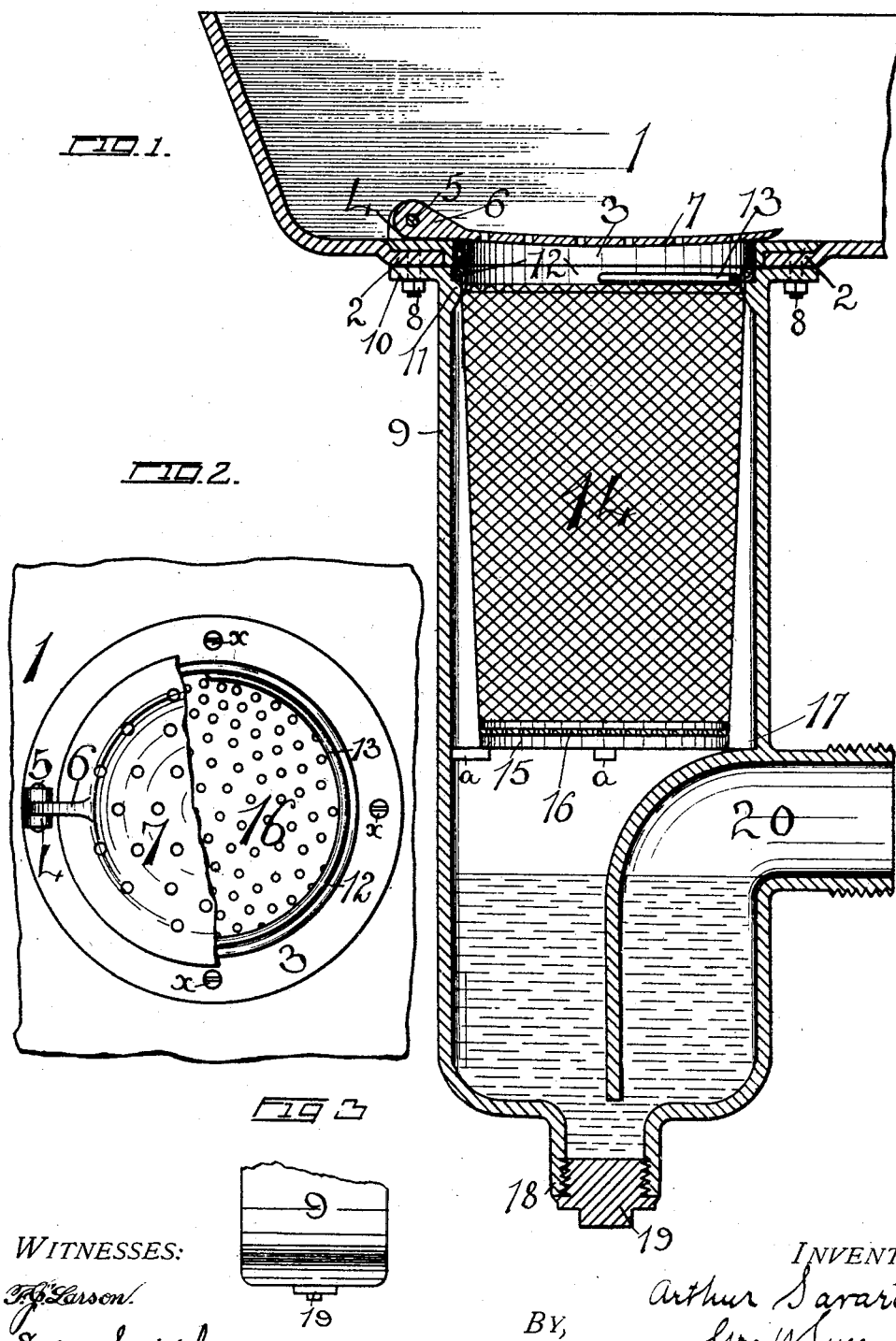

Patented February 14, 1905.

UNITED STATES PATENT OFFICE.

ARTHUR SAVARD, OF OMAHA, NEBRASKA.

SINK-TRAP ATTACHMENT.

SPECIFICATION forming part of Letters Patent No. 782,760, dated February 14, 1905.

Application filed November 20, 1903. Serial No. 182,009.

*To all whom it may concern:*

Be it known that I, ARTHUR SAVARD, residing at Omaha, in the county of Douglas and State of Nebraska, have invented certain useful Improvements in Sink-Trap Attachments; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in garbage-holding attachments for kitchen-sinks.

The aim of my invention is to provide a simple kitchen-sink attachment whereby the solid matter can be flushed directly into the sink-trap in opening a suitable lid and within which is held a receptacle adapted to catch the solid matter, which receptacle can readily be removed to be emptied at suitable times. By this means the sink may always be kept clean and sightly, and whenever it is desired to clean the sink a simple lid is raised to remove the garbage-collecting receptacle; and my invention embodies certain other peculiar arrangements and constructions to be described more fully hereinafter.

In the accompanying drawings I have shown in Figure 1 a broken detached sectional detail of a sink attachment embodying my invention. Fig. 2 shows a top view disclosing the position of the receptacle, while Fig. 3 discloses a side view of the depression in the receptacle.

In carrying out the aim of my invention I provide an ordinary kitchen-sink 1 with an opening which is skirted by an annular depression forming a shoulder or ring, forming a depressed flange 2, as disclosed in Fig. 1, upon which is adapted to be held the ring 3, secured by suitable screws, as disclosed in Fig. 2. Extending upward from this ring 3 is an ear 4, holding a pin 5, adapted to receive the lug 6, forming portion of the perforated shield 7, which shield is thus movably secured in the manner of a door, permitting the same to be opened.

Secured to the annular flange 2 of the sink by means of the flange 10 is a receptacle 9, secured by the screws which below are provided with suitable nuts 8, as disclosed in Fig. 1, and this receptacle 9 is provided above with an annular collar 11 and internally with a plurality of inwardly-projecting lugs *a*. This receptacle 9 is in the form of a tube which has secured to its threaded boss 18 a plug 19, as shown. Extending from this receptacle 9 is the usual trap-pipe 20, to which the exit-pipe is secured.

Held upon the lugs *a* below and supported above by means of the collar 11 is a wire receptacle 14, provided above with an outwardly-flared edge 12 and below with an inwardly-flared edge 17, the edge below being provided by means of a suitable ring 15 and within which is held the perforated bottom 16. To the upper end is secured the bail 13. Now in my invention this removable wire receptacle 14 may be removed at any time in simply opening the lid 7, when the receptacle 14 may be removed, so that its contents may be emptied. These devices may be made in various sizes.

Having thus described my said invention, what I claim as new, and desire to secure by United States Letters Patent, is—

The combination with a sink having an annular opening, of a perforated shield, covering said opening, cylindrical receptacle provided with a securing-flange above adapted to be secured to said sink, surrounding said opening, said receptacle above, being provided with an inwardly-extending collar and plurality of supporting-lugs, within said receptacle, said receptacle being provided below with an opening, plug within said opening, and trap-pipe extending upward and outward from near the bottom within said receptacle and perforated receptacle held by said lugs and said collar as set forth.

In testimony whereof I affix my signature in presence of two witnesses.

ARTHUR SAVARD.

Witnesses:
ETTA SMITH,
M. B. HUNGATE.